United States Patent
Mahurkar et al.

(10) Patent No.: US 12,245,187 B2
(45) Date of Patent: Mar. 4, 2025

(54) SYSTEMS AND METHODS FOR DETECTING MOTION EVENTS BASED ON CHANNEL STATE INFORMATION

(71) Applicant: Verizon Patent and Licensing Inc., Basking Ridge, NJ (US)

(72) Inventors: Sagar Deepak Mahurkar, Frisco, TX (US); Anjaneya Pericharla, Irving, TX (US); Praveen Atreya, Jersey City, NJ (US); Srirama R. Kalidindi, Flower Mound, TX (US); Sanjay Ahuja, Irving, TX (US); Heather E. McDavitt, Far Hills, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 17/823,796

(22) Filed: Aug. 31, 2022

(65) Prior Publication Data

US 2024/0073858 A1  Feb. 29, 2024

(51) Int. Cl.
*H04W 64/00* (2009.01)
*H04B 7/06* (2006.01)

(52) U.S. Cl.
CPC ........ *H04W 64/006* (2013.01); *H04B 7/0626* (2013.01)

(58) Field of Classification Search
CPC . H04W 64/00; H04W 64/003; H04W 64/006; H04B 7/0619; H04B 7/0621; H04B 7/0626

See application file for complete search history.

(56) References Cited

U.S. PATENT DOCUMENTS

| | | | |
|---|---|---|---|
| 10,318,890 B1* | 6/2019 | Kravets | H04W 4/38 |
| 2007/0252693 A1* | 11/2007 | Janson | G08B 13/1961 340/541 |
| 2015/0102922 A1* | 4/2015 | Witmer | G08B 13/2491 340/527 |
| 2018/0365975 A1* | 12/2018 | Xu | H04B 7/0626 |
| 2019/0327124 A1* | 10/2019 | Lai | G01S 5/017 |
| 2021/0120421 A1* | 4/2021 | Schat | H04W 12/122 |
| 2023/0403536 A1* | 12/2023 | Macera | H04W 4/90 |

OTHER PUBLICATIONS

Ma et al., "WiFi Sensing with Channel State Information: A Survey," ACM Computing Surveys, vol. 52, Issue 3, Article 46, Jun. 2019, 36 pages.

\* cited by examiner

*Primary Examiner* — Siu M Lee

(57) ABSTRACT

In some implementations, a first device may obtain first channel state information (CSI) of a second device. The first device may determine that a variance of the first CSI exceeds a variance threshold. The first device may determine that a motion event has occurred based on determining that the variance, of the first CSI, exceeds the variance threshold. The first device may determine a location of the motion event based on the first CSI and second CSI of a third device. The first device may adjust an operation of one or more devices associated with the location based on determining the motion event.

20 Claims, 11 Drawing Sheets

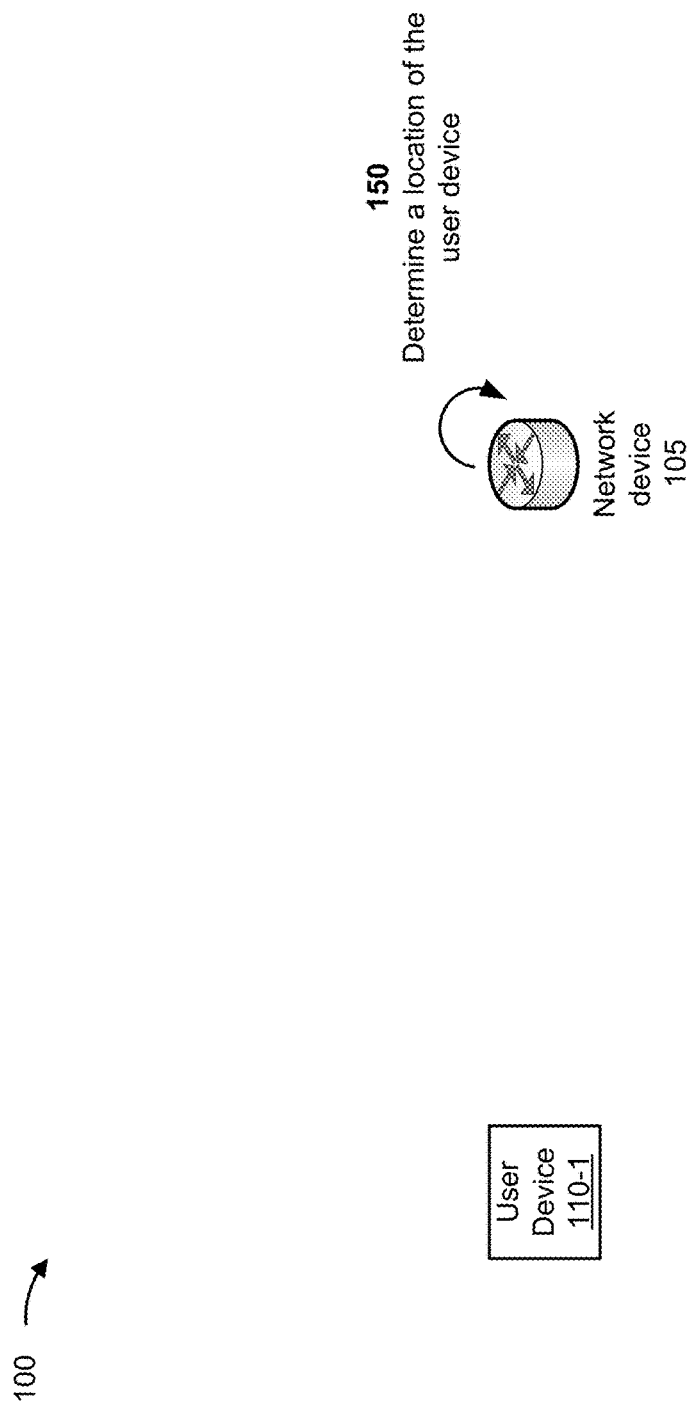

SYSTEMS AND METHODS FOR DETECTING MOTION EVENTS BASED ON CHANNEL STATE INFORMATION

BACKGROUND

A local area network (LAN) may include a group of computing devices that are connected to one another in a limited area. As an example, multiple user devices of a user, in a home of the user, may be part of a LAN. In some situations, channel state information (CSI) may be determined for a communication link between the user devices. The CSI may describe how a signal propagates from a transmitting device to a receiving device. The CSI may indicate a combined effect of scattering, fading, and power decay with distance.

BRIEF DESCRIPTION OF THE DRAWINGS

FIGS. 1A-1G are diagrams of an example associated with determining motion events based on CSI.

DETAILED DESCRIPTION OF PREFERRED EMBODIMENTS

Figure 1A:
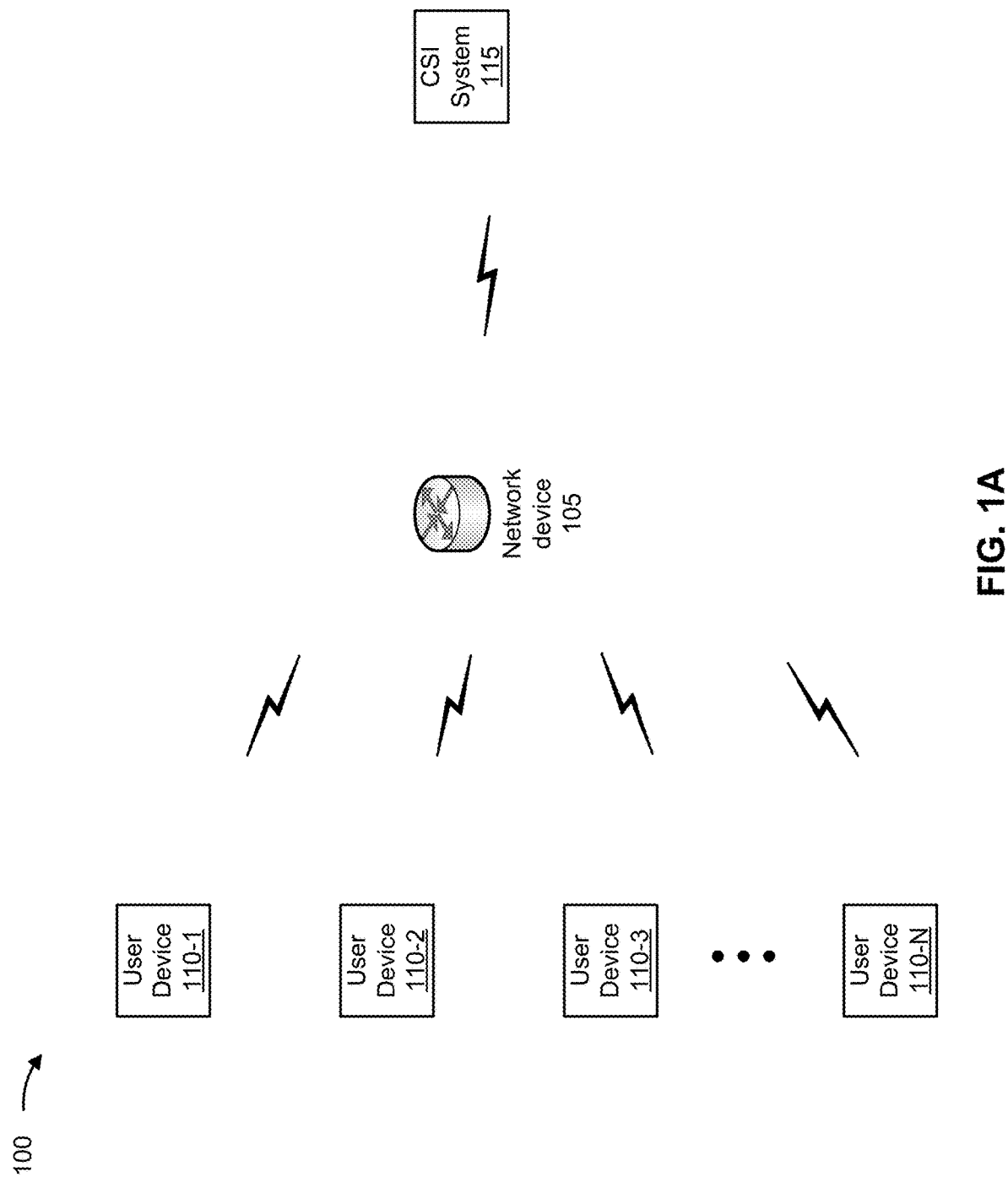

The following detailed description of example implementations refers to the accompanying drawings. The same reference numbers in different drawings may identify the same or similar elements.

Motion may be monitored and detected in different rooms (e.g., of a home of a user). As an example, cameras may be used to monitor and detect motion in the different rooms. Using cameras in this manner requires configuring the cameras (e.g., sensitivity, brightness, software, among other examples), determining installation locations of the cameras, configuring positions of the cameras, configuring the cameras to communicate with different user devices via a network, configuring additional devices for use in conjunction with the cameras, configuring storage devices to store image data and/or video data captured the cameras, among other examples.

Therefore, using the cameras in this manner is time consuming. Additionally, using the cameras in this manner consumes network resources, computing resources, storage resources, among other examples. Furthermore, using the cameras may cause issues related to privacy.

Implementations described herein are directed to using channel state information (CSI) of one or more devices (e.g., user devices), connected to a router, to detect a motion event. For example, the router may receive one or more signals from a first user device (connected to the router) and determine first CSI associated with the one or more signals. The router may determine whether a variance, of the first CSI, exceeds a variance threshold.

Based on determining that the variance exceeds the variance threshold, the router may determine that a motion event has occurred. A motion event may be used to refer to an event during which a motion occurs. In some implementations, the router may determine a location of the motion event based on a location of the device. Additionally, or alternatively, the router may determine a location of the motion event based on information regarding the first user device and information regarding a second user device connected to the router. For example, the router may determine a location of the motion event based on the first CSI and second CSI associated with one or more signals received from the second user device. The router may cause one or more devices, associated with the location of the motion event, to adjust an amount of resources consumed by the one or more devices, based on determining that the motion event has occurred.

By determining motion events as described herein, the router may preserve that the amount of time would have otherwise been used to configure cameras to monitor and detect motion events. Additionally, by determining motion events as described herein, the router may preserve network resources, computing resources, and/or storage resources that would have otherwise been consumed by configuring cameras to monitor and detect motion events. Furthermore, by determining motion events as described herein, the router may prevent issues relating to privacy from occurring.

FIGS. 1A-1G are diagrams of an example implementation 100 associated with determining motion events based on CSI. As shown in FIG. 1A, example implementation 100 includes a network device 105, user devices 110 (individually "user device 110" and collectively "user devices 110"), and a CSI system 115. These devices are described in more detail below in connection with FIG. 2 and FIG. 4.

Network device 105 includes one or more devices capable of receiving, processing, storing, routing, and/or providing traffic (e.g., a packet and/or other information or metadata) in a manner described herein. For example, network device 105 may include a router, such as a label switching router (LSR), a label edge router (LER), an ingress router, an egress router, a provider router (e.g., a provider edge router or a provider core router), a virtual router, or another type of router.

In some implementations, network device 105 may be configured to determine CSI associated with signals received from user devices 110. For example, network device 105 may execute a container (e.g., a Wi-Fi sensing container) that is configured to determine the CSI associated with the signals received from user devices 110. Network device 105 may use the CSI to detect motion events, as described herein.

User device 110 includes one or more devices capable of receiving, generating, storing, processing, and/or providing information associated with determining motion events, as described elsewhere herein. User device 110 may include a communication device and a computing device. For example, user device 110 may include a wireless communication device, a mobile phone, a user equipment, a laptop computer, a tablet computer, a desktop computer, a smart device (e.g., a smart television, a smart speaker, a smart display device, a smart light, among other examples), a gaming console, a set-top box, a wearable communication device (e.g., a smart wristwatch, a pair of smart eyeglasses, a head mounted display, or a virtual reality headset), or a similar type of device.

Network device 105 and user devices 110 may be located in different locations of a customer premises of a user. For example, network device 105 and user devices 110 may be located in different rooms of the customer premises. In some examples, the user may provide location information identifying the location of user devices 110. For example, the user may indicate that user device 110-1 is located in a first room of the customer premises, indicate that user device 110-2 is located in a second room of the customer premises, and so on.

The location information of a user device 110 may be stored, in a location data structure, in association with device information of such user device 110 (e.g., a name of such user device 110, information identifying a manufacturer of such user device 110, information identifying a serial number of such user device 110, among other examples). The location data structure may be a database, a table, and/or a linked list.

In some implementations, network device 105 may be a device owned by a network service provider. Additionally, one or more user devices 110 may be devices owned by the network service provider. Such one or more user devices 110 may include a set-top box, a tablet computer, a smart display device, among other examples. One or more other user devices 110 may be devices owned by the user. In some situations, network device 105 and user devices 110 may be part of a local area network (LAN).

CSI system may include one or more devices capable of processing CSI and providing processed CSI to network device 105 to enable network device 105 to detect motion events. CSI system may be included in a cloud computing environment, as described below in connection with FIG. 2.

Figure 1B:
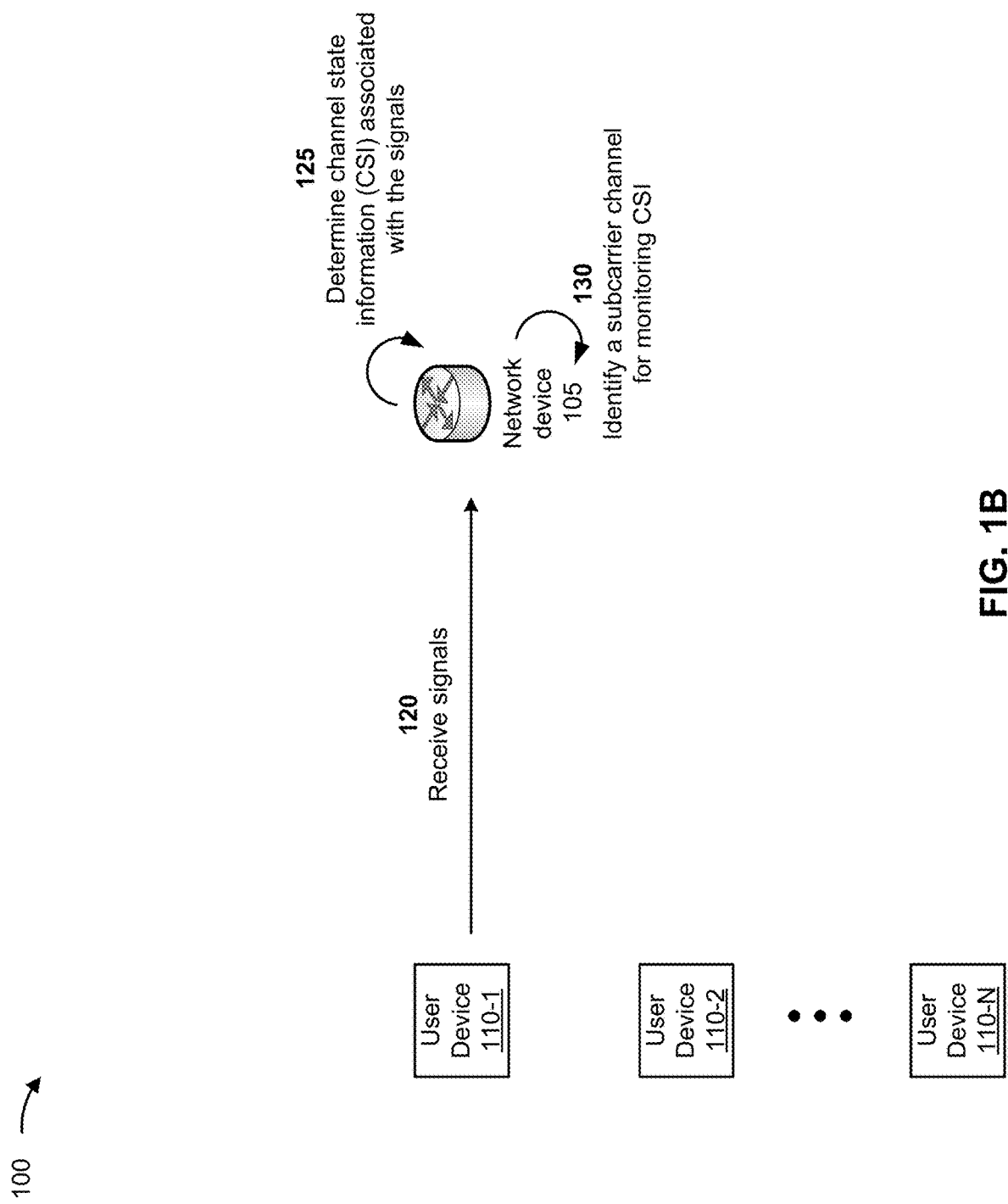

As shown in FIG. 1B, and by reference number 120, network device 105 may receive signals. For example, network device 105 may receive the signals from user device 110-1. In some examples, network device 105 may receive the signals by way of non-line of sight radio frequency transmission. Network device 105 may receive the signals based on providing a request to user device 110-1. For example, network device 105 may provide a request for information and may receive the information via the signals. Additionally, or alternatively, to receiving the signals based on providing the request to user device 110-1, network device 105 may receive the signals as part of a request from user device 110-1 to network device 105. For example, network device 105 may receive the signals as part of user device 110-1 providing a request to establish a connection with network device 105 and/or a connection with a network associated with network device 105. Additionally, or alternatively, to receiving the signals as part of a request from user device 110-1, network device 105 may receive the signals as part of signals periodically provided by user device 110-1 to network device 105.

In some implementations, network device 105 and user device 110-1 may communicate using orthogonal frequency-division multiplexing (OFDM). In this regard, network device 105 may receive the signals via different subcarrier channels. For example, network device 105 may receive a first signal (of the signals from user device 110-1) via a first subcarrier channel, receive a second signal (of the signals from user device 110-1) via a second subcarrier channel, and so on.

As shown in FIG. 1B, and by reference number 125, network device 105 may determine CSI associated with the signals (e.g., received from user device 110-1). For example, network device 105 may analyze the signals to determine a manner in which the signals have been propagated from user device 110-1 to network device 105. Network device 105 may determine an effect, on the signals, of scattering, fading, and/or power decay with distance.

In some implementations, network device 105 may use the container (e.g., the Wi-Fi sensing container) to determine (or estimate) the CSI associated with the signals received from user device 110-1. For instance, network device 105 may determine first CSI associated with the first signal (of the signals received from user device 110-1), determine second CSI associated with the second signal (of the signals received from user device 110-1), and so on.

As shown in FIG. 1B, and by reference number 130, network device 105 may identify a subcarrier channel for monitoring CSI (e.g., for subsequent monitoring of CSI). For example, network device 105 may analyze the CSI associated with the signals received from user device 110-1 to identify a subcarrier channel with a highest variance (e.g., highest phase variance and/or highest amplitude variance) out of variances associated with the different subcarrier channels. For instance, network device 105 may identify a subcarrier channel that is subject to a highest measure of sensitivity with respect to scattering, fading, and/or power decay with distance for signals transmitted via that subcarrier channel. By identifying a subcarrier channel with the highest variance (or subject to the highest measure of sensitivity) and monitoring CSI on such subcarrier channel, network device 105 may be able to more accurately and efficiently detect motion events based on signals received from user device 110-1.

In some implementations, when identifying such a subcarrier channel, network device 105 may perform phase analysis on the different subcarrier channels. For example, network device 105 may analyze a phase indicated by the first CSI to determine a phase variance of the first subcarrier channel, analyze a phase indicated by the second CSI to determine a phase variance of the second subcarrier channel, and so on. In some examples, when determining the phase variance of the first subcarrier channel, network device 105 may determine a phase difference between consecutive packets transmitted via the first subcarrier channel.

In some situations, network device 105 may determine the phase variance of the first subcarrier channel based on the phase difference between consecutive packets, an average phase variance of the different subcarrier channels, and a previously determined phase variance for the first subcarrier channel. For example, network device 105 may determine the phase variance based on a mathematical combination of the phase difference between consecutive packets, the average phase variance of the different subcarrier channels, and the previously determined phase variance. In some examples, the phase difference between consecutive packets, the average phase variance of the different subcarrier channels, and the previously determined phase variance for the first subcarrier channel may be weighted.

Additionally, or alternatively, to performing phase analysis, network device 105 may perform amplitude analysis on the different subcarrier channels. Network device 105 may perform the amplitude analysis in a manner similar to the manner described above in connection with performing the phase analysis. Network device 105 may perform similar actions to identify a respective subcarrier channel for monitoring CSI associated with signals received from user device 110-2, for monitoring CSI associated with signals received from user device 110-3, and so on.

Figure 1C:
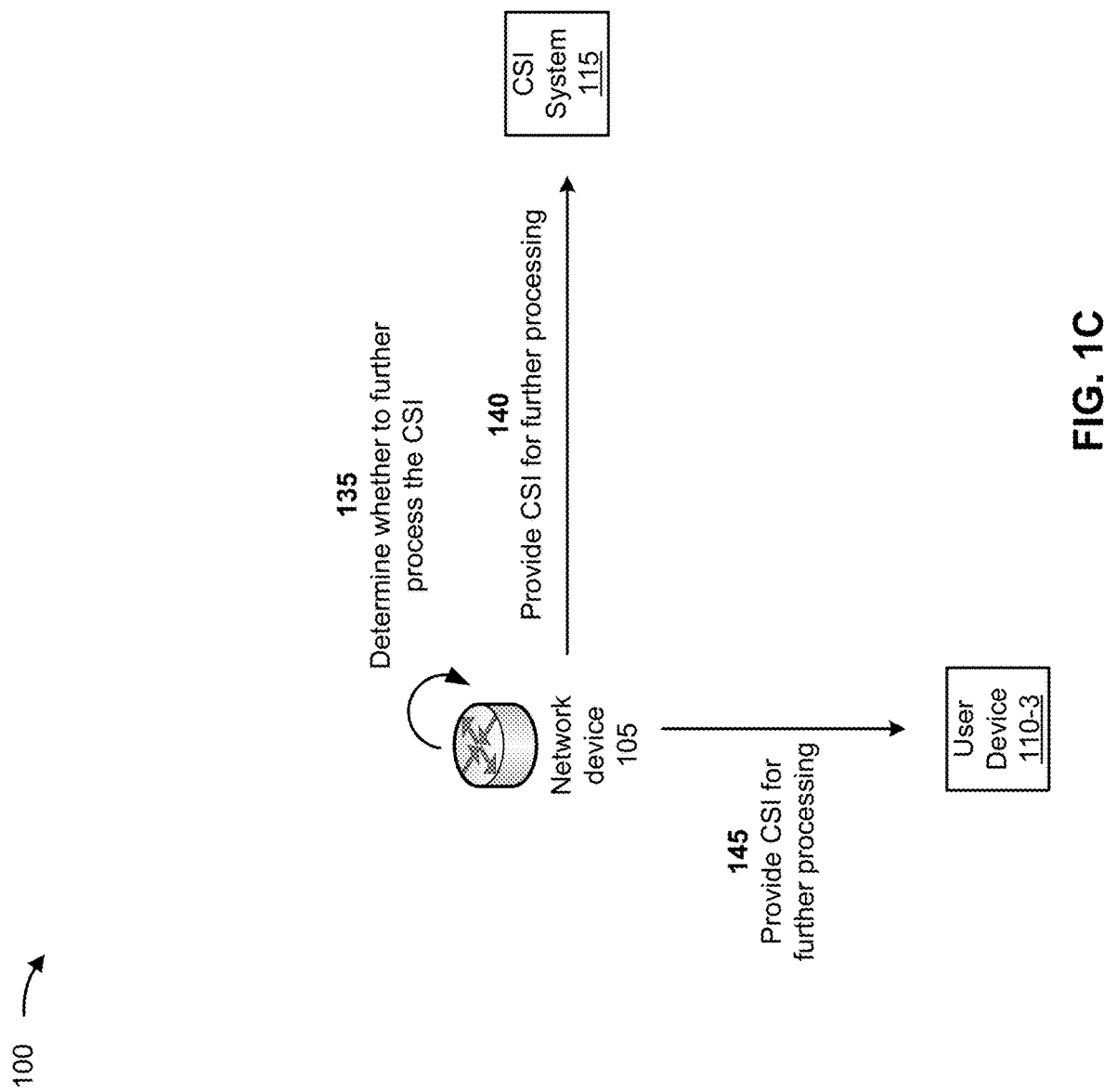

As shown in FIG. 1C, and by reference number 135, network device 105 may determine whether to further process the CSI. The CSI may be processed to generate processed CSI. In some implementations, the CSI may be further processed for the purpose of noise reduction, for the purpose of signal transformation (e.g., from one format to another format), for the purpose of signal extraction, for the purpose of accounting for different sampling rates, among other examples. In some situations, the CSI may be further processed prior to identifying the subcarrier channel for monitoring CSI, as described above in connection with FIG. 1B.

Network device 105 may determine whether network device 105 is capable of further processing the CSI. For example, network device 105 may determine whether network device 105 has sufficient computing resources to further process the CSI. If network device 105 determines that network device 105 is capable of further processing the CSI, network device 105 may further process the CSI. Alternatively, if network device 105 determines that network device 105 is not capable of further processing the CSI, network device 105 may cause a user device 110 or CSI system 115 to further process the CSI. The user device 110 and CSI system 115 may be devices that are capable of further processing the CSI. In some implementations, in addition to further processing the CSI, network device 105 may cause a user device 110 or CSI system 115 to determine the phase variance, in a manner similar to the manner described above. Network device 105 may cause a user device 110 or CSI system 115 to determine the phase variance based on a mathematical combination of the phase difference between consecutive packets, the average phase variance of the different subcarrier channels, and/or the previously determined phase variance.

As shown in FIG. 1C, and by reference number 140, network device 105 may provide the CSI for further processing. For example, based on determining that network device 105 is not capable of further processing the CSI, network device 105 may determine whether the processed CSI is to be used by an application associated with a low latency requirement (e.g., a latency that does not satisfy a latency threshold). If network device 105 determines that the processed CSI is to be used by an application that is not associated with a low latency requirement (e.g., to be used by a motion detection application), network device 105 may provide the CSI to CSI system 115 to cause the CSI to be further processed by CSI system 115. Network device 105 may receive the processed CSI from CSI system 115.

As shown in FIG. 1C, and by reference number 145, network device 105 may provide the CSI for further processing. For example, based on determining that network device 105 is not capable of further processing the CSI, if network device 105 determines that the processed CSI is to be used by an application associated with the low latency requirement, network device 105 may provide the CSI to a user device 110 to cause the CSI to be further processed by such user device 110. Network device 105 may receive the processed CSI from user device 110. Network device 105 and user device 110 may be connected via a secure LAN connection. In some examples, user device 110 may be a device owned by the network service provider.

By providing the CSI to a user device 110 included in a same LAN as network device 105 (instead of to CSI system 115), network device 105 may satisfy the low latency requirement of the application. For example, by providing the CSI to a user device 110 included in a same LAN as network device 105 (instead of to CSI system 115), network device 105 may improve a time efficiency associated with processing the CSI, thereby satisfy the low latency requirement.

As shown in FIG. 1D, and by reference number 150, network device 105 may determine a location of the user device. In some examples, when determining the location of user device 110-1, network device 105 may determine the location of user device 110-1 using the location data structure. For example, network device 105 may determine the location of user device 110-1 by performing a lookup of the location data structure using the device information. In some situations, network device 105 may receive the device information via one or more of the signals received from user device 110-1 and may use the device information to perform the lookup.

Additionally, or alternatively, to perform the lookup of the location data structure, network device 105 may determine the location of user device 110-1 using the CSI of the subcarrier channel identified by network device 105 (or using the processed CSI). For example, network device 105 may determine the location of user device 110-1 using a time of flight associated with the CSI and the angle of arrival associated with the CSI. In some situations, the time of flight and the angle of arrival may be determined based on the amplitude and/or the phase associated with the CSI.

In some implementations, the location of user device 110-1 may be a location relative to network device 105 (e.g., X,Y coordinates of user device 110-1 relative to coordinates of network device 105). For example, network device 105 may be located at coordinates (0,0) and the location of user device 110-1 may some X,Y coordinates relative to the coordinates (0,0). The coordinates of user device 110-1 may indicate a distance between network device 105 and user device 110-1 and indicate whether user device 110-1 is to the left of network device 105 or to the right of network device 105.

When using the time of flight and the angle of arrival to determine the location of user device 110-1 (e.g., relative to network device 105), the time of flight may be used to determine a distance between network device 105 and user device 110-1. The angle of arrival may be used to determine a direction from which network device 105 received the signals. Network device 105 may determine the X,Y coordinates of user device 110-1 (e.g., bi-dimensional location of user device 110-1) based on the distance and the direction. In other words, network device 105 may determine the location of user device 110-1 using triangulation involving the time of flight and the angle of arrival. In some situations, network device 105 may update the location information of user device 110-1 to include the coordinates of user device 110-1 (e.g., in addition to information identifying the room in which user device 110-1 is located).

Network device 105 may determine locations of one or more other user devices 110 in a manner similar to the manner described above in connection with FIG. 1D. Network device 105 may store device information of the one or more other user devices 110 in association with the coordinates determined for the one or more other user devices 110 in the location data structure. In some situations, the locations of the user devices 110 may be used to determine a map of different areas (e.g., a map of different rooms of the customer premises). The map of the different areas may be used to confirm a presence of the user devices 110 in the different areas. For example, the map may confirm that user device 110-1 is located in a first area (e.g., a first room), confirm that user device 110-2 and user device 110-3 are located in a second area (e.g., a second room), and so on.

Figure 1E:
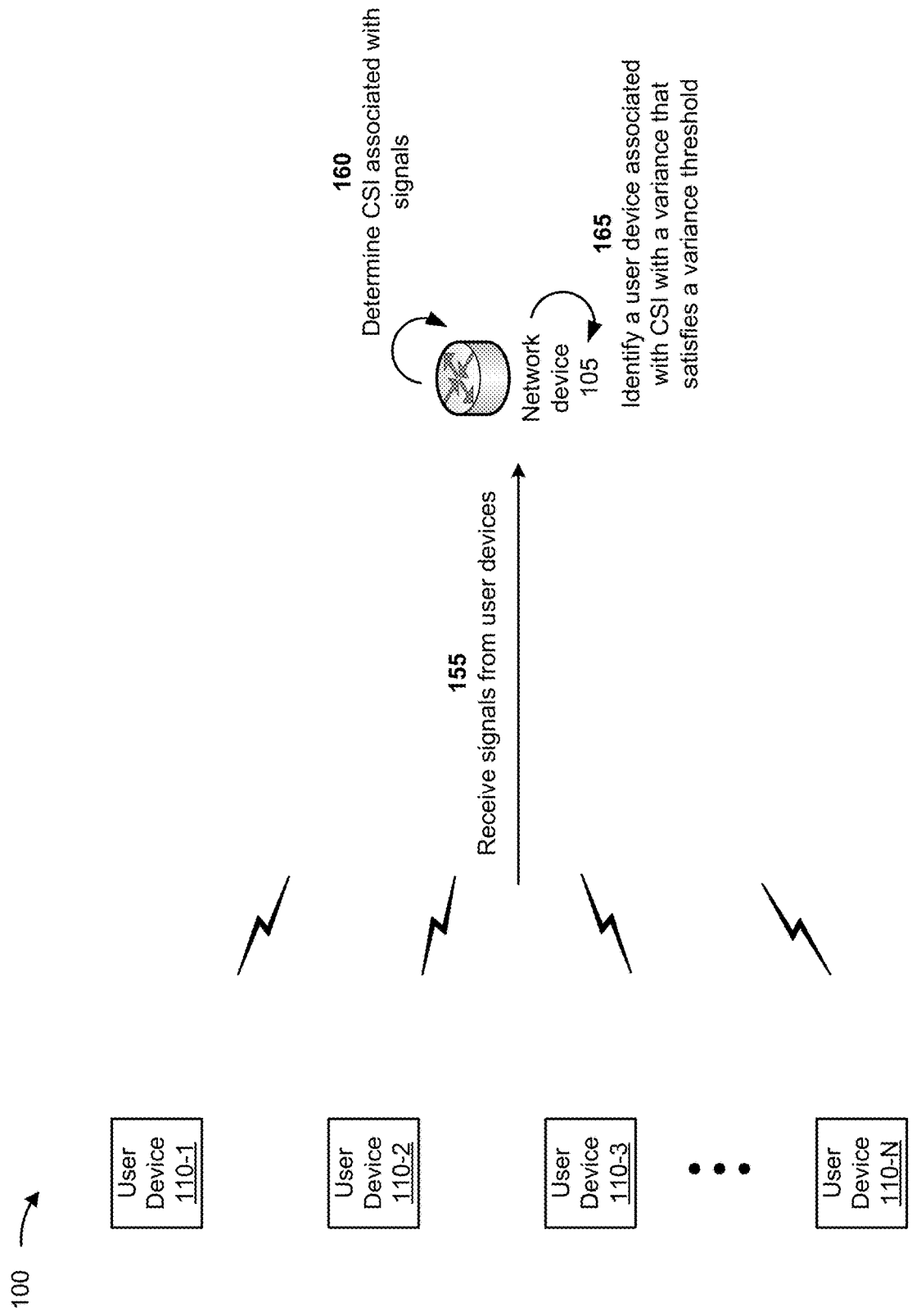

As shown in FIG. 1E, and by reference number 155, network device 105 may receive signals from user devices. For example, after determining the location of user device 110-1 (and/or after determining the locations of one or more additional user devices 110), network device 105 may receive signals from user device 110-1, user device 110-2, and so on in a manner similar to the manner described above in connection with FIG. 1A. Network device 105 may identify a respective subcarrier channel for each of user devices 110 in a manner similar to the manner described above in connection with FIG. 1B. In this regard, network device 105 may monitor the identified subcarrier channels and receive the signals from user device 110-1 via the identified subcarrier channels.

As shown in FIG. 1E, and by reference number 160, network device 105 may determine CSI associated with the signals. For example, network device 105 may determine first CSI associated with one or more signals received from user device 110-1, second CSI associated with one or more signals received from user device 110-2, and so on. Network device 105 may determine the CSI associated with the signals in a manner similar to the manner described above in connection with FIG. 1B. In some implementations, network device 105 may further process the CSI in a manner similar to the manner described above in connection with FIG. 1C.

As shown in FIG. 1E, and by reference number 165, network device 105 may identify a user device associated with CSI with a variance that satisfies a variance threshold. For example, network device 105 may analyze the CSI (associated with the signals received as described above) to identify CSI with a variance that satisfies the variance threshold. In some situations, the CSI may be CSI with a highest variance (e.g., a highest phase variance and/or a highest amplitude variance). In other words, network device 105 may identify the CSI indicating a greatest measure of disruption out of the measure of disruption indicated by the CSI associated with the signals. Network device 105 may identify a user device 110 associated with the CSI with the highest variance. For example, network device 105 may identify user device 110-1 as a user device 110 associated with the CSI with the highest variance.

In some implementations, network device 105 may analyze the CSI over a time window (or a time frame). In some examples, the time window may be selected by network device 105 (e.g., based on a pre-configuration of network device 105), by an administrator of the network service provider, among other examples. The time window may facilitate discrete processing of the signals.

Figure 1F:
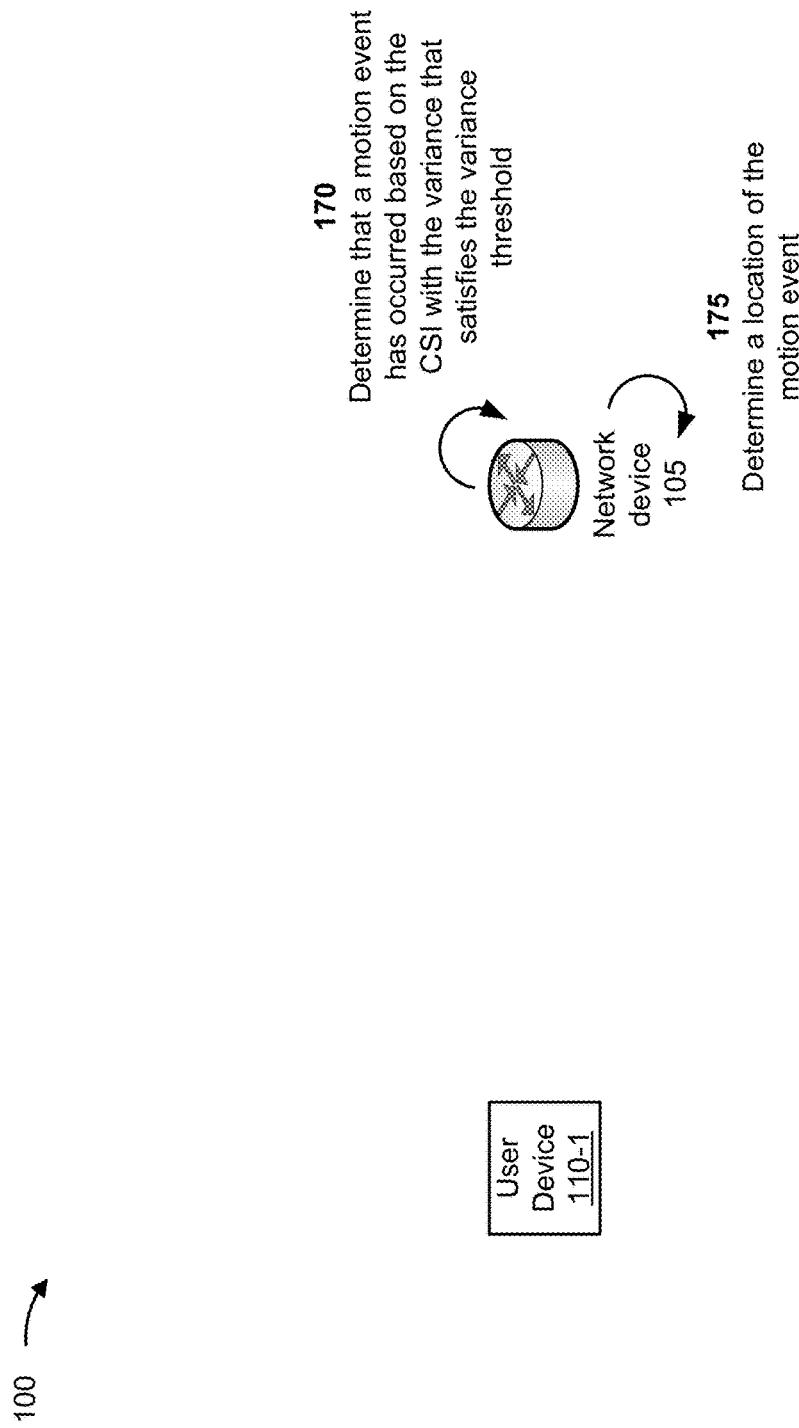

As shown in FIG. 1F, and by reference number 170, network device 105 may determine that a motion event has occurred based on the CSI with the variance that satisfies the variance threshold. For example, the variance satisfying the variance threshold may indicate that the motion event has occurred. Accordingly, network device 105 may detect the motion event based on the variance satisfying the variance threshold.

As shown in FIG. 1F, and by reference number 175, network device 105 may determine a location of the motion event. For example, network device 105 may determine a location of user device 110-1 (e.g., the user device 110 associated with the CSI with the variance that satisfies the variance threshold). In some implementations, network device 105 may determine the location of the motion event as the location of user device 110-1. For example, network device 105 may determine a room in which user device 110-1 is located and may determine that the motion event occurred in the room. Network device 105 may determine the room in which user device 110-1 is located using the location data structure. For example, network device 105 may use the device information of user device 110-1 to obtain the location information of user device 110-1. The location information may identify a room in which user device 110-1 is located.

In some implementations, network device 105 may determine the location of the motion event using information regarding user device 110-1 and information regarding another user device 110 (e.g., user device 110-2). In some situations, user device 110-2 may be another user device 110 located in the same room as the room in which user device 110-1 is located. Additionally, in some situations, user device 110-2 may be a user device 110 with a second highest variance located in the same room. Network device 105 may identify user device 110-2 using the location data structure and information identifying the room. The location data structure may provide information identifying user devices 110 located in the room. Additionally, network device 105 may identify a user device 110 with a second highest variance out of the user devices 110 located in the room. In other words, network device 105 may identify user device 110-2 based on user device 110-2 being located in the same room as user device 110-1 and/or based on user device 110-2 having a second highest variance.

In some implementations, network device 105 may determine the location of the motion event based on the location of user device 110-1, the location of user device 110-2, and a variance of amplitude of the CSI associated with the signals during one or more time windows. As an example, network device 105 may determine the location of the motion event based on the following formula:

$$X \text{ motion event} = (X1*dA1 + X2*dA2 + \ldots + XN*dAN) / (dA1 + dA2 + \ldots + dAN)$$

$$Y \text{ motion event} = (Y1*dA1 + Y2*dA2 + \ldots + YN*dAN) / (dA1 + dA2 + \ldots + dAN)$$

where X1 and Y1 are the coordinates of user device 110-1, X2 and Y2 are the coordinates of user device 110-2, and so on, dA1 is the variance of an amplitude of the CSI in a first time window, dA2 is the variance of an amplitude of the CSI in a second time window, and so on.

Network device 105 may determine the coordinates of user device 110-1 and the coordinates of user device 110-2 using the location data structure, as explained above. In some situations, a time window may be one second or less. The variance of the amplitude of the CSI in a time window may be determined based on a difference between an amplitude of the CSI associated with signals (from user device 110-1) in the time window and an amplitude of the CSI associated with signals (from user device 110-2) in the time window. Network device 105 may determine the variance of the amplitude in this manner in order to eliminate a static offset of the CSI associated with the signals from user device 110-1.

In some implementations, network device 105 may determine the location of the motion event based on the location of user device 110-1, the location of user device 110-2, and a variance of phase of the CSI associated with the signals during one or more time windows, in a manner similar to the manner described above. Additionally, or alternatively, network device 105 may determine the location of the motion event based on the location of user device 110-1, the location of user device 110-2, a first direction of a signal (from user device 110-1) used to determine the CSI associated with user device 110-1, and a second direction of a signal (from user device 110-2) used to determine the CSI associated with user device 110-2. The location of user device 110-1, the location of user device 110-2, the first direction, and the second direction may be used to determine an intersection of an angle of arrival of the signals transmitted by user device 110-1 and by user device 110-2.

In some implementations, network device 105 may determine the location of the motion event based on the location of user device 110-1, the location of user device 110-2, and a motion energy of the signals associated with the CSI associated with user device 110-1. As an example, network device 105 may determine the location of the motion event based on the following formula:

$$X \text{ motion event} = (X1*E1 + X2*E2 + \ldots + XN*EN) / (E1 + E2 + \ldots + EN)$$

$$Y \text{ motion event} = (Y1*E1 + Y2*E2 + \ldots + YN*EN) / (E1 + E2 + \ldots + EN)$$

where X1 and Y1 are the coordinates of user device 110-1, X2 and Y2 are the coordinates of user device 110-2, and so on, E1 is the motion energy of a signal associated with the CSI in a first time window, E2 is the motion energy of a signal associated with the CSI in a second time window, and so on.

Network device 105 may determine the coordinates of user device 110-1 and the coordinates of user device 110-2 using the location data structure, as explained above. In some situations, a time window may be one second or less. The motion energy of a signal in a time window may be determined based on a difference between a phase of the CSI associated with a signal (from user device 110-1) in the time window and a phase of the CSI associated with a signal (from user device 110-2) in the time window. A fast Fourier transform (FFT) may be calculated using the difference to determine the motion energy. The FFT may be calculated to obtain frequency-time domain values.

In some instances, the motion energy may be determine using the following formula:

$$\text{Energy} = \sum_{i=1}^{window\_length/2} \text{magnitude}^2$$

Where the magnitude values are the normalized FFT coefficients calculated over a time window.

In some implementations, network device 105 may determine the location of the motion event based on a combination of two or more different methods for determining the location of the motion event explained above. In some situations, the combination of the two or more methods may be a weighted combination.

Network device 105 may determine a room corresponding to the location of the motion event (e.g., a room corresponding to the coordinates of the motion event). For example, network device 105 may obtain the location information of user device 110-1 from the location data structure and determine whether the location information identifies a room. If the location information identifies a room for user device 110-1, network device 105 may determine that the motion event occurred in the room. If the location information does not identify a room for user device 110-1, network device 105 may identify another user device 110 (e.g., user device 110-2) within a distance threshold of user device 110-1. Network device 105 may identify a room in which user device 110-2 is located (based on the location information of user device 110-2) and determine that the motion event occurred in the room in which user device 110-2 is located.

A measure of confidence associated with identifying a room for the motion event may be based on the location information of user device 110-1. For example, the measure of confidence when the location information identifies a room for user device 110-1 may exceed the measure of confidence when the location information does not identify a room for user device 110-1.

Network device 105 may determine a plurality of motion events based on CSI of signals from one or more user devices 110 and determine locations of the plurality of motion events, as described herein. Network device 105 may analyze the locations of the plurality of motion events to identify a first location (e.g., a first room) for a first group of motion events of the plurality of motion events, identify a second location (e.g., a second room) for a second group of motion events of the plurality of motion events, and so on. For example, network device 105 may determine that a first cluster of motion events occurred in the first room, a second cluster of motion events occurred in the second room, and so on.

Network device 105 may perform the actions described above (periodically and/or based on a trigger) to update the groups of motion events and the locations for the groups of motion events. In some implementations, network device 105 may use the locations associated with the first group of motion events to determine a first area relative to network device 105, use the locations associated with the second group of motion events to determine a second area relative to network device 105, and so on. The first area may correspond to the first room, the second area may correspond to the second room, and so on.

Figure 1G:
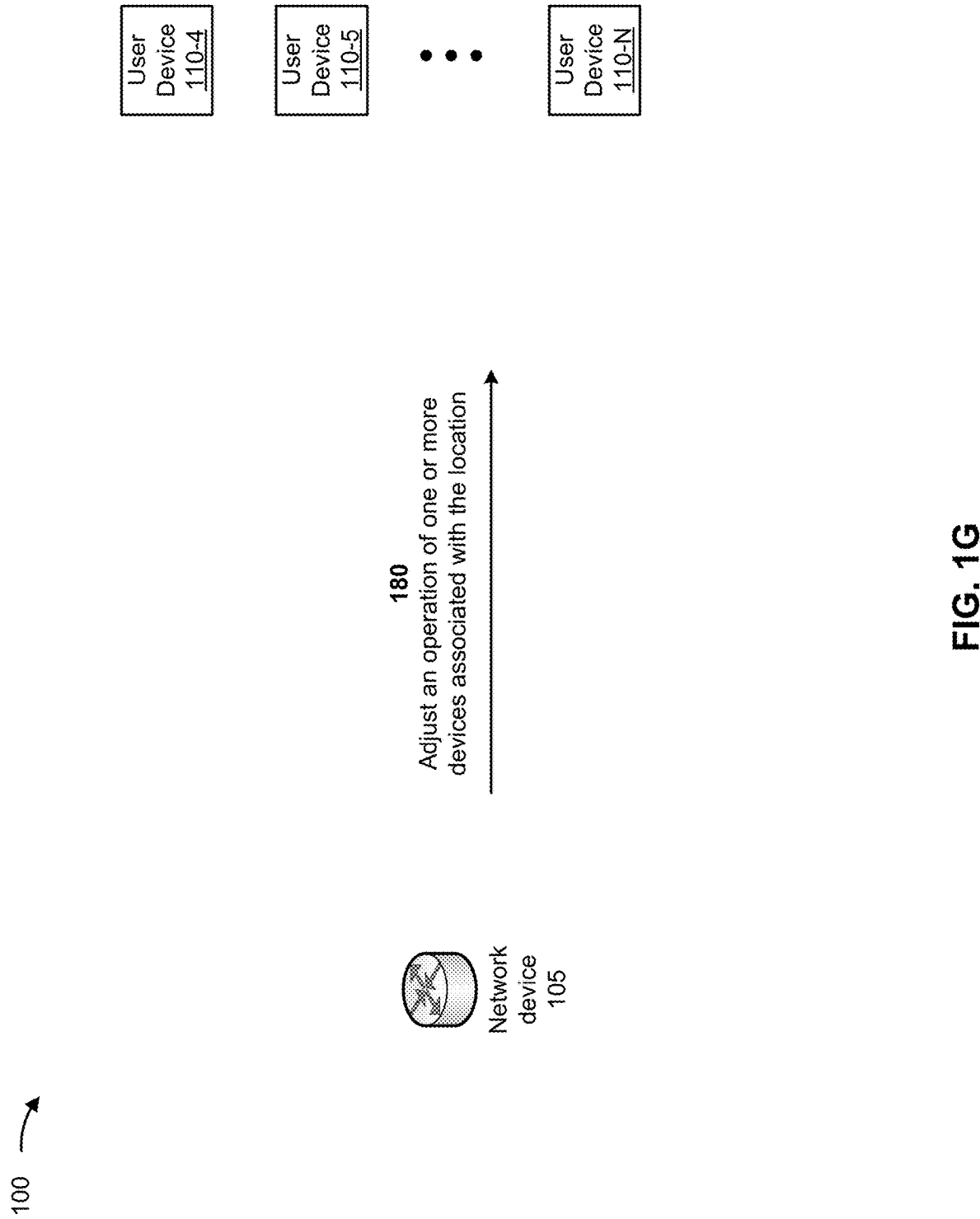

As shown in FIG. 1G, and by reference number 180, network device 105*n* may adjust an operation of one or more device associated with the location. For example, network device 105 may cause the one or more devices to adjust an amount of resources consumed by the one or more devices. In some implementations, network device 105 may obtain room information regarding the room in which the motion event occurred. The room information may be obtained from one or more memories associated with network device 105. The room information may include room device information identifying devices associated with the room and resources information identifying a manner in which an amount of resources consumed by devices is to be adjusted based on motion events occurring (or not occurring) in the room.

The room device information may indicate that the one or more devices include a thermostat controller, a smart television, a smart display, a smart speaker, a smart light, among other examples. As shown in FIG. 1G, the one or more devices may include user devices 110-4, 110-5, and so on.

The resources information may indicate that, based on determining that the motion event has occurred, network device 105 is to cause the one or more devices to maintain or increase a temperature in the room on a cold day, to maintain or decrease the temperature on a warm day, maintain or increase light intensity of the smart light, to be turned on (if the one or more devices were off prior to the motion event occurring), maintain or increase a volume (e.g., of the smart television, the smart display, and/or the smart speaker), among other examples.

Alternatively, the resources information may indicate that, based on determining that the motion event has not occurred, network device 105 is to cause the one or more devices to decrease the temperature on a cold day, to increase temperature on a warm day, to decrease light intensity of the smart light, to be turned off if the one or more devices are on, to decrease the volume (e.g., of the smart television, the smart display, and/or the smart speaker), among other examples of actions to reduce or preserve the amount of resources consumed by the one or more devices.

In some implementations, the resources information may include bandwidth priority information identifying a bandwidth priority. The bandwidth priority may indicate that bandwidth utilized by the one or more devices is to be prioritize over bandwidth utilized by one or more other devices in another room when motion events have occurred in the room associated with the one or more devices. In other words, the information identifying the bandwidth priority may cause network device 105 to increase an amount of bandwidth utilized by the one or more devices and decrease an amount of bandwidth utilized by the one or more other devices when motion events are detected in the room associated with the one or more devices.

As an example, network device 105 may determine the bandwidth priority associated with the room based on the bandwidth priority information. Based on determining that the motion event has occurred in the room and based on the bandwidth priority, network device 105 may cause an adjustment of an amount of bandwidth utilized by the one or more devices in the room as described above.

By determining motion events as described herein, the router may preserve that the amount of time would have otherwise been used to configure cameras to monitor and detect motion events. Additionally, by determining motion events as described herein, the router may preserve network resources, computing resources, and/or storage resources that would have otherwise been consumed by configuring cameras to monitor and detect motion events. Furthermore, by determining motion events as described herein, the router may prevent issues, relating to privacy, from occurring.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
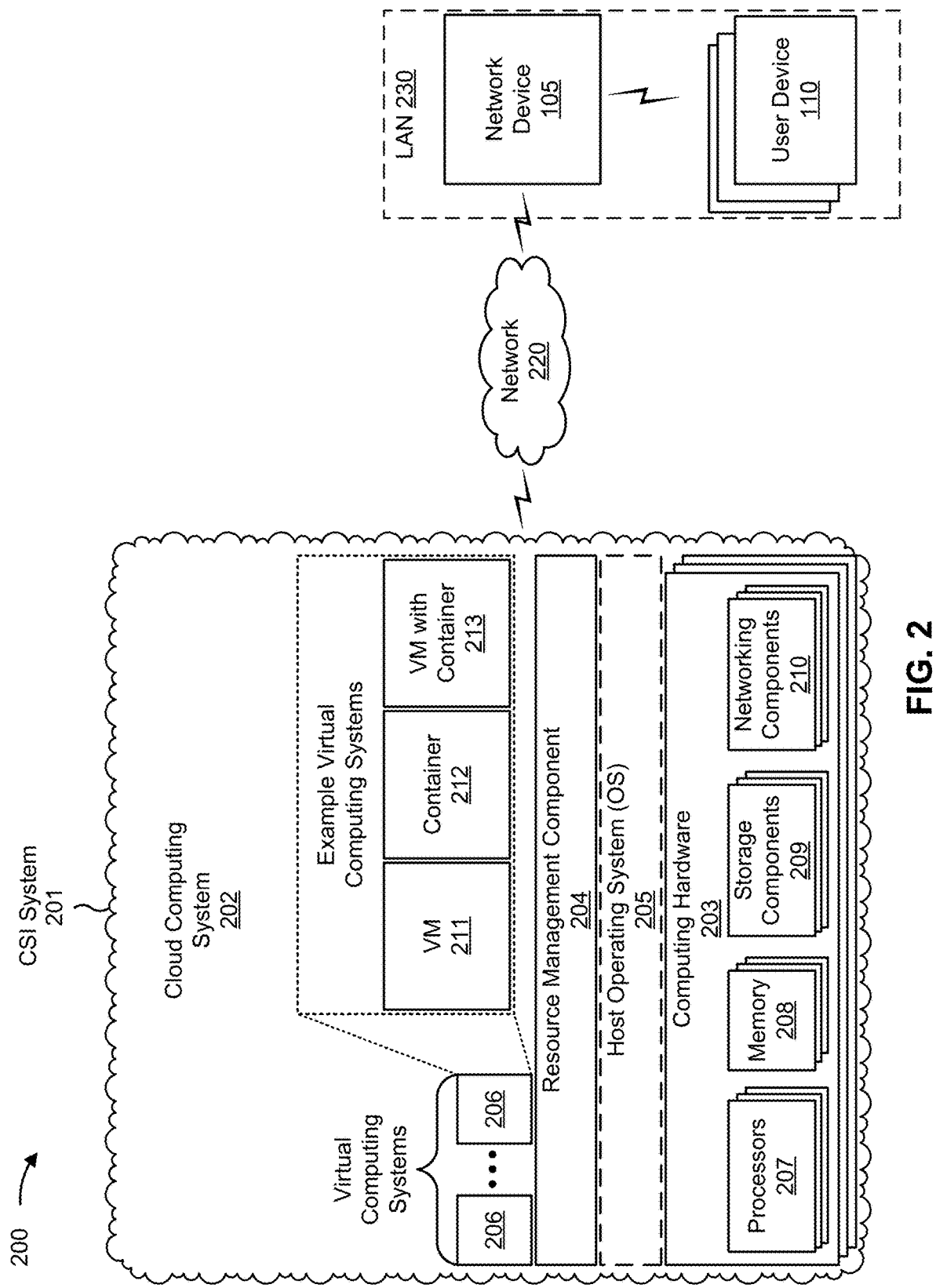
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a CSI system 201, which may include one or more elements of and/or may execute within a cloud computing system 202. The cloud computing system 202 may include one or more elements 203-213, as described in more detail below. As further shown in FIG. 2, environment 200 may include a network 220, a network device 105, and multiple user devices 110. Network device 105 and user devices 110 have been described above in connection with FIG. 1A. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the CSI system 201 may include one or more elements 203-213 of the cloud computing system 202, may execute within the cloud computing system 202, and/or may be hosted within the cloud computing system 202, in some implementations, the CSI system 201 may not be cloud-based (e.g., may be implemented outside of a cloud computing system) or may be partially cloud-based. For example, the CSI system 201 may include one or more devices that are not part of the cloud computing system 202, such as device 300 of FIG. 3, which may include a standalone server or another type of computing device. The CSI system 201 may perform one or more operations and/or processes described in more detail elsewhere herein.

Network 220 includes one or more wired and/or wireless networks. For example, network 220 may include a cellular network, a public land mobile network (PLMN), a LAN, a wide area network (WAN), a private network, the Internet, and/or a combination of these or other types of networks. The network 220 enables communication among the devices of environment 200.

Additionally, or alternatively, to the description of network device 105 above in connection with FIG. 1A, network device 105 may include a gateway, a switch, a firewall, a hub, a bridge, a reverse proxy, a server (e.g., a proxy server, a cloud server, or a data center server), a load balancer, and/or a similar device. In some implementations, network device 105 may be a physical device implemented within a housing, such as a chassis. In some implementations, network device 105 may be a virtual device implemented by one or more computing devices of a cloud computing environment or a data center. In some implementations, a group of network devices 105 may be a group of data center nodes that are used to route traffic flow through a network.

As shown in FIG. 2, network device 105 and user devices 110 may be included in a network. For example, network device 105 and user devices 110 may be included in a LAN 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
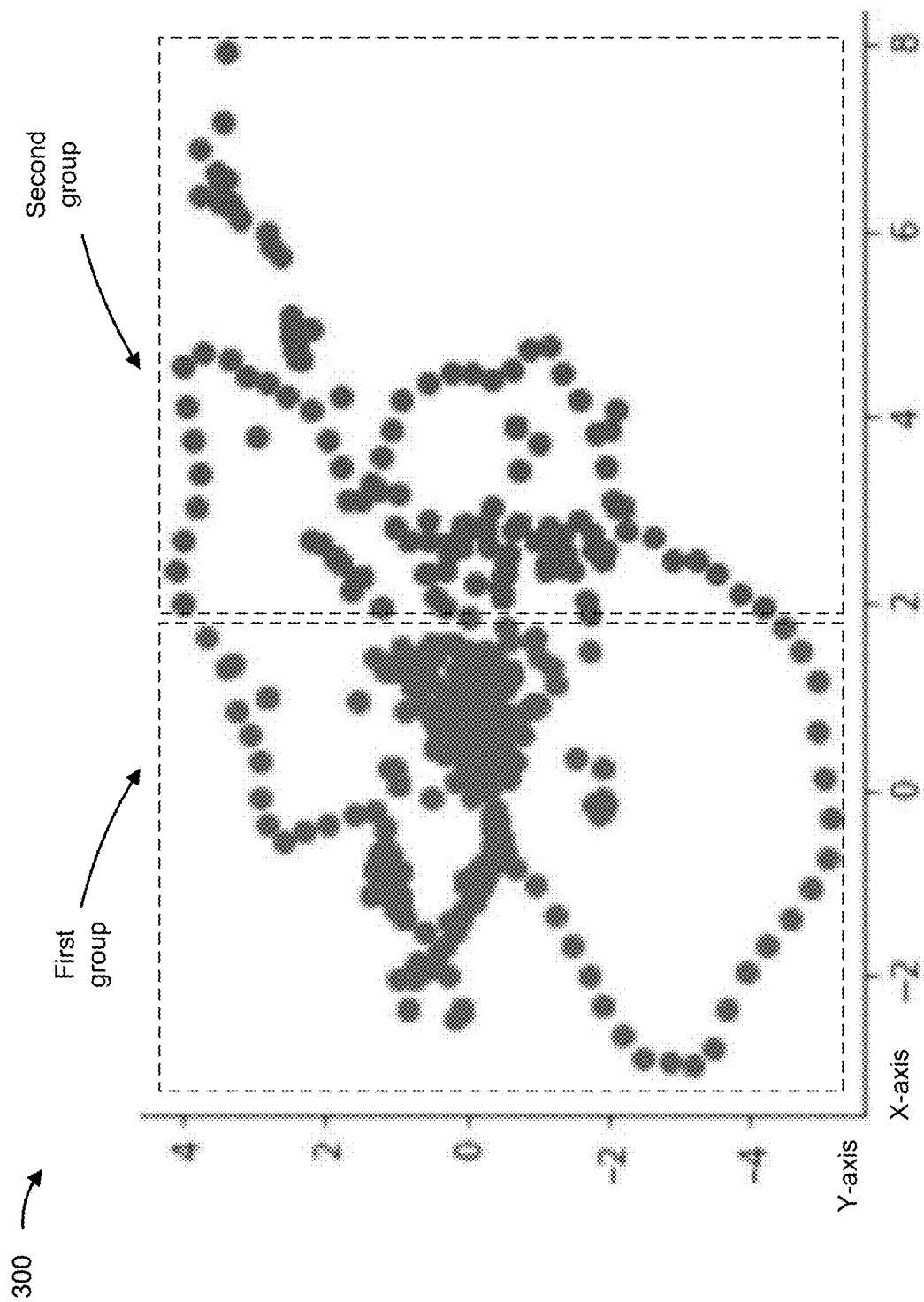
FIG. 3 is a diagram of an example map of clustering of motion events.

FIG. 3 is a diagram of an example map 300 of clustering of motion events. As shown in FIG. 3, map 300 includes a plurality of graphical elements (e.g., dots) representing motion events that were detected as described herein. Each graphical element is provided at X,Y coordinates relative to coordinates of network device 105. For example, network device 105 may be located at coordinates (0,0). As shown in map 300, a first group of graphical elements are associated with a first location (e.g., a first room) and a second group of graphical elements are associated with a second location (e.g., a second room).

As indicated above, FIG. 3 is provided as an example. Other examples may differ from what is described with regard to FIG. 3. The number and arrangement of graphical elements shown in FIG. 3 is provided as an example.

Figure 4:
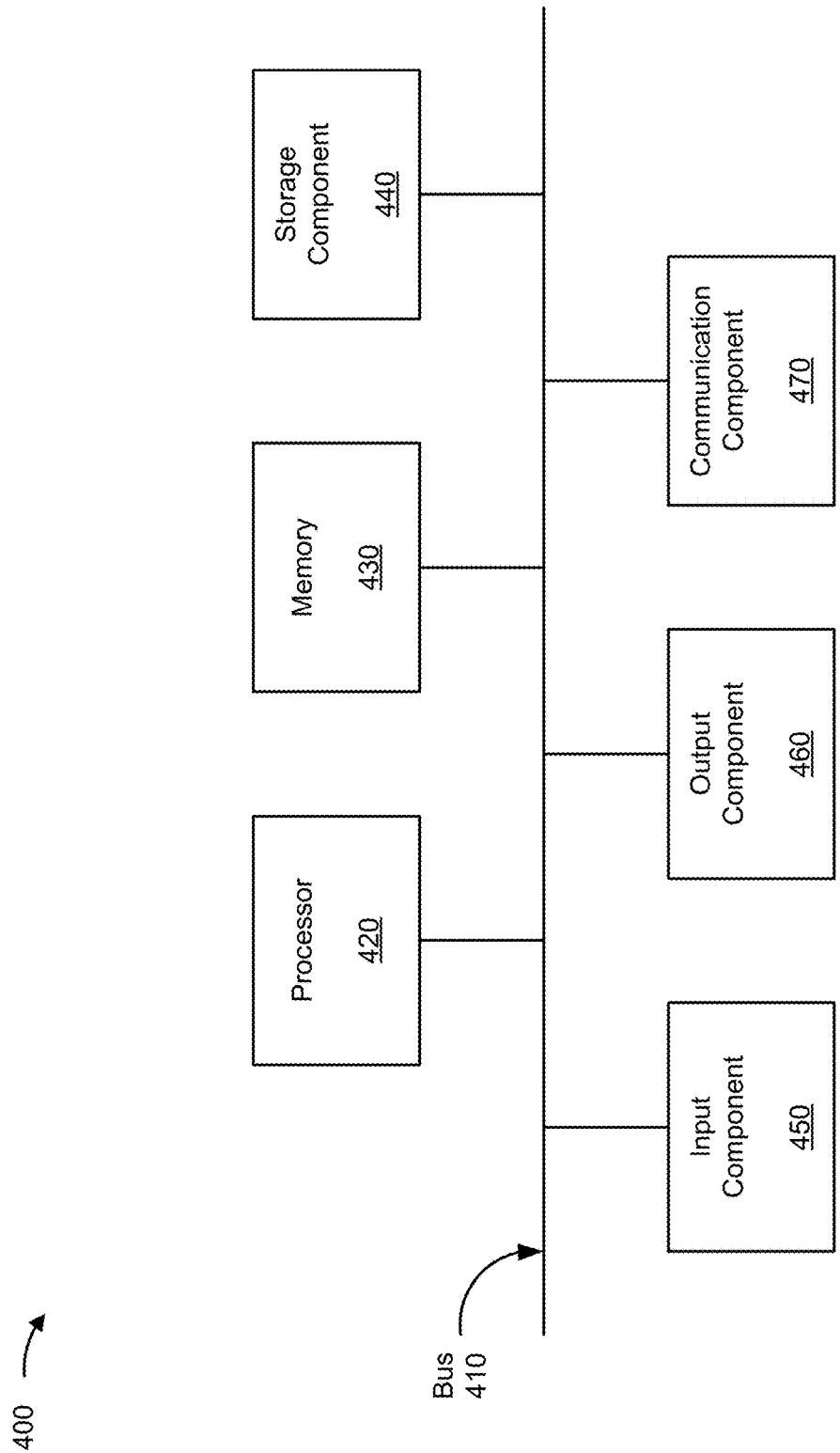
FIG. 4 is a diagram of example components of one or more devices of FIG. 2.

FIG. 4 is a diagram of example components of a device 400, which may correspond to network device 105, user devices 110, and/or CSI system. In some implementations, network device 105, user devices 110, and/or CSI system may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
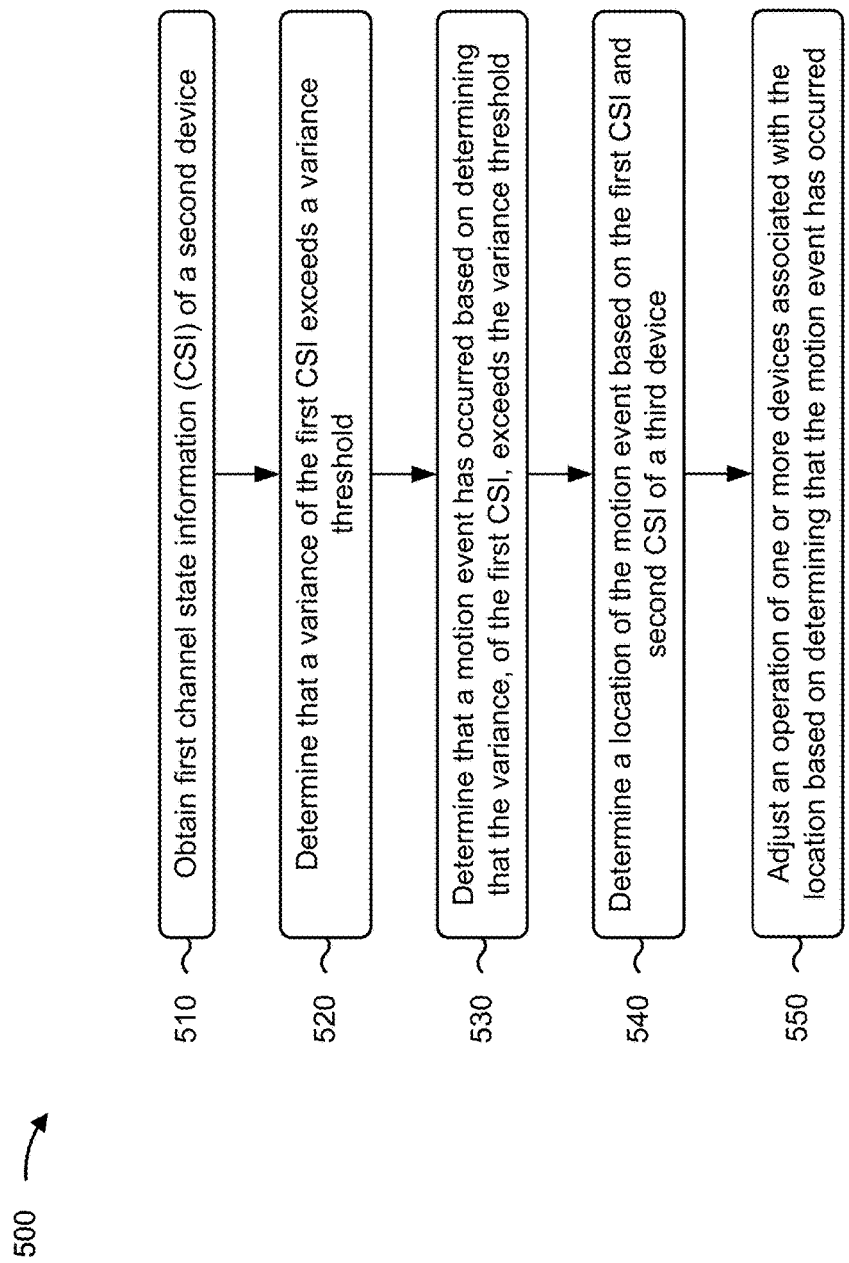
FIG. 5 is a flowchart of an example process relating to determining motion events based on CSI.

FIG. 5 is a flowchart of an example process 500 associated with systems and methods for determining motion events. In some implementations, one or more process blocks of FIG. 5 may be performed by a first device (e.g., network device 105). In some implementations, one or more process blocks of FIG. 5 may be performed by another device or a group of devices separate from or including the first device, such as a first user device (e.g., user device 110-1), a second user device (e.g., user device 110-2), and/or a CSI system (e.g., CSI system). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining first CSI of a second device (block 510). For example, the first device may obtain first CSI of a second device, as described above.

The first device may include a router. The second device may be wirelessly connected to the router.

In some implementations, process 500 may include determining whether the first device is capable of processing the first CSI; and selectively processing the first CSI to obtain processed first CSI or causing a fourth device to process the first CSI to obtain the processed first CSI based on determining whether the first device is capable of determining the location. The first CSI is processed by the first device based on determining that the first device is capable of processing the first CSI. The first device causes the fourth device to process the first CSI based on determining that the first device is not capable of processing the first CSI. The first device and the fourth device are connected to a local area network. Obtaining the first CSI comprises obtaining the processed first CSI.

As further shown in FIG. 5, process 500 may include determining that a variance of the first CSI exceeds a variance threshold (block 520). For example, the first device may determine that a variance of the first CSI exceeds a variance threshold, as described above.

As further shown in FIG. 5, process 500 may include determining that a motion event has occurred based on determining that the variance, of the first CSI, exceeds the variance threshold (block 530). For example, the first device may determine that a motion event has occurred based on determining that the variance, of the first CSI, exceeds the variance threshold, as described above.

As further shown in FIG. 5, process 500 may include determining a location of the motion event based on the first CSI and second CSI of a third device (block 540). For example, the first device may determine a location of the motion event based on the first CSI and second CSI of a third device, as described above.

In some implementations, process 500 may include identifying the third device based on determining that the motion event has occurred, wherein identifying the third device includes: identifying the third device as a device at the location, or identifying the third device as a device with CSI that exceeds the variance threshold.

In some implementations, determining the location of the motion event comprises determining a first location of the second device with respect to the first device, determining a second location of the third device with respect to the first device, determining a first amplitude of the first CSI and a second amplitude of the second CSI, and determining the location of the motion event based on the first location, the second location, the first amplitude, and the second amplitude.

In some implementations, determining the location of the motion event comprises determining a first location of the second device with respect to the first device, determining a second location of the third device with respect to the first device, determining a first direction of a signal associated with the first CSI, determining a second direction of a signal associated with the second CSI, and determining the location of the motion event based on the first location, the second location, the first direction, and the second direction.

In some implementations, determining the location of the motion event comprises determining a first location of the second device with respect to the first device, determining a second location of the third device with respect to the first device, determining first energy associated with the first CSI, determining second energy associated with the second CSI, and determining the location of the motion event based on the first location, the second location, the first energy, and the second energy.

As further shown in FIG. 5, process 500 may include adjusting an operation of one or more devices associated with the location based on determining that the motion event has occurred (block 550). For example, the first device may adjust an operation of one or more devices associated with the location based on determining that the motion event has occurred, as described above.

In some implementations, adjusting the operation of the one or more devices comprises adjusting an amount of bandwidth utilized by the one or more devices based on determining that the motion event has occurred at the location.

In some implementations, process 500 may include determining a priority, associated with the location, with respect to bandwidth utilization of devices associated with the location; and adjusting an amount of bandwidth utilized by the one or more devices based on determining that the motion event has occurred at the location and based on the priority.

In some implementations, one or more instructions, when executed by the one or more processors, further cause the first device to determine that the first device is not capable of processing the CSI; and selectively cause a third device to process the CSI to obtain processed CSI or cause a fourth device to process the CSI to obtain the processed CSI, based on determining that the first device is not capable of processing the CSI. The processed CSI is analyzed to determine whether the motion event has occurred. The first device causes the third device to process the CSI based on determining that the processed CSI is to be used by an application associated with latency that does not satisfy a latency threshold. The first device causes the fourth device to process the CSI based on determining that the processed CSI is to be used by an application associated with latency that satisfies the latency threshold. The first device and the third device are connected to a local area network. The fourth device is included in a cloud computing environment.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a first device, the method comprising:
    obtaining first channel state information (CSI) of a second device;
    determining that a variance of the first CSI exceeds a variance threshold;
    determining that a motion event has occurred based on determining that the variance, of the first CSI, exceeds the variance threshold;
    determining a location of the motion event based on the first CSI and second CSI of a third device; and
    adjusting an operation of one or more devices associated with the location based on determining that the motion event has occurred.

2. The method of claim 1, further comprising:
    identifying the third device based on determining that the motion event has occurred,
    wherein identifying the third device includes:
        identifying the third device as a device at the location, or
        identifying the third device as a device with CSI that exceeds the variance threshold.

3. The method of claim 1, wherein determining the location of the motion event comprises:
    determining a first location of the second device with respect to the first device;
    determining a second location of the third device with respect to the first device;
    determining a first amplitude of the first CSI and a second amplitude of the second CSI; and
    determining the location of the motion event based on the first location, the second location, the first amplitude, and the second amplitude.

4. The method of claim 1, wherein determining the location of the motion event comprises:
    determining a first location of the second device with respect to the first device;
    determining a second location of the third device with respect to the first device;
    determining a first direction of a signal associated with the first CSI;
    determining a second direction of a signal associated with the second CSI; and
    determining the location of the motion event based on the first location, the second location, the first direction, and the second direction.

5. The method of claim 1, further comprising:
    determining whether the first device is capable of processing the first CSI; and
    selectively processing the first CSI to obtain processed first CSI or causing a fourth device to process the first CSI to obtain the processed first CSI based on determining whether the first device is capable of determining the location,
        wherein the first CSI is processed by the first device based on determining that the first device is capable of processing the first CSI,
        wherein the first device causes the fourth device to process the first CSI based on determining that the first device is not capable of processing the first CSI,
        wherein the first device and the fourth device are connected to a local area network, and
        wherein obtaining the first CSI comprises obtaining the processed first CSI.

6. The method of claim 1, wherein determining the location of the motion event comprises:
    determining a first location of the second device with respect to the first device;
    determining a second location of the third device with respect to the first device;
    determining first energy associated with the first CSI;
    determining second energy associated with the second CSI; and
    determining the location of the motion event based on the first location, the second location, the first energy, and the second energy.

7. The method of claim 1, wherein adjusting the operation of the one or more devices comprises:
    adjusting an amount of bandwidth utilized by the one or more devices based on determining that the motion event has occurred at the location.

8. A first device, comprising:
    one or more processors configured to:
        obtain channel state information (CSI) of a second device;
        determine that a variance of the CSI exceeds a variance threshold;
        determine that a motion event has occurred based on determining that the variance, of the CSI, exceeds the variance threshold;

determine a location of the motion event based on the CSI; and cause one or more devices, associated with the location, to adjust an amount of resources consumed by the one or more devices, based on determining that the motion event has occurred.

9. The first device of claim 8, wherein the one or more processors, to cause the one or more devices to adjust the amount of resources consumed, are configured to:

determine a priority, associated with the location, with respect to bandwidth utilization of devices associated with the location; and adjust an amount of bandwidth utilized by the one or more devices based on determining that the motion event has occurred at the location and based on the priority.

10. The first device of claim 8, wherein the first device incudes a router, and wherein the second device is wirelessly connected to the router.

11. The first device of claim 8, wherein the one or more processors are further configured to:

obtain CSI of a plurality of devices wirelessly connected to the first device;

determine a plurality of motion events based on the CSI of the plurality of devices;

determine locations of the plurality of motion events based on the CSI of the plurality of devices; and analyze the locations of the plurality of motion events to identify:

a first location for a first group of motion events of the plurality of motion events, and a second location for a second group of motion events of the plurality of motion events.

12. The first device of claim 8, wherein the CSI of the second device is first CSI, and wherein the one or more processors are further configured to:

obtain second CSI of the second device prior to obtaining the first CSI; and determine a location of the second device, with respect to the first device, based on the second CSI.

13. The first device of claim 8, wherein the CSI of the second device is first CSI, and wherein the one or more processors are further configured to:

determine first coordinates of a first location of the second device with respect to the first device;

determine second coordinates of a second location of a third device with respect to the first device;

determine a variance between an amplitude of the first CSI and an amplitude of second CSI of the third device; and determine the location of the motion event based on the first coordinates, the second coordinates, and the variance between the amplitude of the first CSI and the amplitude of the second CSI of the third device.

14. The first device of claim 8, wherein the CSI of the second device is first CSI, and wherein the one or more processors are further configured to:

determine first coordinates of a first location of the second device with respect to the first device;

determine second coordinates of a second location of a third device with respect to the first device;

determine first energy associated with the first CSI;

determine second energy associated with second CSI of the third device; and determine the location of the motion event based on the first location, the second location, the first energy, and the second energy.

15. A non-transitory computer-readable medium storing a set of instructions, the set of instructions comprising:

one or more instructions that, when executed by one or more processors of a first device, cause the first device to:

obtain channel state information (CSI) of a second device;

analyze the CSI to determine whether a motion event has occurred;

cause one or more devices to increase an amount of resources consumed by the one or more devices based on determining that the motion event has occurred; and cause the one or more devices to reduce the amount of resources consumed by the one or more devices based on determining that the motion event has not occurred.

16. The non-transitory computer-readable medium of claim 15, wherein the one or more instructions, when executed by the one or more processors, further cause the first device to:

identify a subcarrier channel out of a plurality of subcarrier channels for communicating with the second device, wherein the subcarrier channel is identified based on a variance of amplitude and phase of the subcarrier channel exceeding a variance of amplitude and phase of one or more other subcarrier channels of the plurality of subcarrier channels;

receive a signal, from the second device, via the subcarrier channel; and process the signal to obtain the CSI.

17. The non-transitory computer-readable medium of claim 15, wherein the one or more instructions, when executed by the one or more processors, further cause the first device to:

determine a location of the second device; and determine a location of the motion event based on the location of the second device and one or more of an energy associated with the CSI, a variance of an amplitude of the CSI, or a direction of a signal associated with the CSI.

18. The non-transitory computer-readable medium of claim 15, wherein the one or more instructions, that cause the first device to cause the one or more devices to reduce the amount of resources consumed, cause the first device to:

determine that the motion event has not occurred at a location of the second device; and cause the one or more devices to reduce the amount of resources consumed by the one or more devices based on determining that the motion event has not occurred at the location of the second device.

19. The non-transitory computer-readable medium of claim 15, wherein the one or more instructions, that cause the first device to cause the one or more devices to increase the amount of resources consumed, cause the first device to:

determine that the motion event has occurred at a location of the second device; and increase an amount of bandwidth utilized by the one or more devices based on determining that the motion event has occurred at the location.

20. The non-transitory computer-readable medium of claim 15, wherein the one or more instructions, when executed by the one or more processors, further cause the first device to:
- determine that the first device is not capable of processing the CSI; and
- selectively cause a third device to process the CSI to obtain processed CSI or cause a fourth device to process the CSI to obtain the processed CSI, based on determining that the first device is not capable of processing the CSI,
    - wherein the processed CSI is analyzed to determine whether the motion event has occurred,
    - wherein the first device causes the third device to process the CSI based on determining that the processed CSI is to be used by an application associated with latency that does not satisfy a latency threshold,
    - wherein the first device causes the fourth device to process the CSI based on determining that the processed CSI is to be used by an application associated with latency that satisfies the latency threshold,
    - wherein the first device and the third device are connected to a local area network, and
    - wherein the fourth device is included in a cloud computing environment.

* * * * *